(12) United States Patent
Ennis et al.

(10) Patent No.: US 6,663,905 B1
(45) Date of Patent: Dec. 16, 2003

(54) PATCH BAG HAVING WRAP-AROUND PATCH

(75) Inventors: Gary D. Ennis, Wichita Falls, TX (US); Larry W. DePoorter, Wichita Falls, TX (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/042,479

(22) Filed: Mar. 16, 1998

(51) Int. Cl.$^7$ .......................... B65D 75/00; B65D 75/26
(52) U.S. Cl. .................. 426/129; 426/106; 426/115; 426/415
(58) Field of Search .................. 426/124, 127, 426/129, 415; 383/109, 114, 116, 119, 115, 106

(56) References Cited

U.S. PATENT DOCUMENTS

| | | | |
|---|---|---|---|
| 2,870,954 A | 1/1959 | Kulesza | 229/62.5 |
| 2,891,870 A | 6/1959 | Selby et al. | 99/174 |
| 2,911,305 A | 11/1959 | Rumsey, Jr. | 99/171 |
| 3,122,297 A | 2/1964 | Sachs | 229/14 |
| 3,204,825 A | 9/1965 | Underwood | 222/105 |

(List continued on next page.)

FOREIGN PATENT DOCUMENTS

| | | |
|---|---|---|
| AU | A-11228/88 | 4/1988 |
| AU | A-76395/91 | 11/1991 |
| CA | 2022977 | 11/1991 |
| DE | 41 25 172 A1 | 2/1993 |
| EP | 0 151 489 | 8/1985 |
| EP | 0 435 498 | 7/1991 |
| EP | 0 512 740 A2 | 11/1992 |
| EP | 0 562 496 A1 | 9/1993 |
| EP | 0 621 205 A1 | 10/1994 |
| FR | 72.38520 | 10/1972 |
| GB | 654460 | 6/1951 |
| GB | 925035 | 5/1963 |
| GB | 2 057 392 | 4/1981 |
| GB | 2 074 128 | 10/1991 |
| GB | 2 291 402 | 1/1996 |
| JP | 6 2101-427 A | 11/1987 |
| NZ | 236317 | 12/1990 |
| NZ | 230362 | 9/1991 |
| NZ | 236523 | 4/1993 |
| WO | WO 90/03414 | 4/1990 |
| WO | WO 93/03093 | 2/1993 |
| WO | WO 96/00688 | 1/1996 |

OTHER PUBLICATIONS

ASTM 2732, "Standard Test Method for Unrestrained Linear Thermal Shrinkage of Plastic Film and Sheeting", pp 368–371.

"Determination of Branching Distributions in Polyethylene and Ethylene Copolymers", Wild et al., Journal of Polymer Science, vol. 20, pp 441–455.

*Primary Examiner*—Curtis E. Sherrer
(74) *Attorney, Agent, or Firm*—Rupert B. Hurley, Jr.

(57) ABSTRACT

An end-seal patch bag has a patch which extends more than 50 percent of the total transverse distance around the bag, the patch covering at least a portion of at least one side edge of the bag. A side-seal patch bag has a patch which extends more than 50 percent of the total longitudinal distance around the bag, the patch covering at least a portion of the bottom edge of the bag. For both end-seal and side-seal patch bags, the patch covers at least a portion of each lay-flat side of the bag. The invention includes a process for making these end-seal and side-seal patch bags, as well as packaged products utilizing these patch bags. By providing a patch which covers more than just one lay-flat side of the bag, the use of a second patch can be avoided, together with the inefficiency, alignment, and registration challenges encountered if more than one patch is applied to the bag.

22 Claims, 9 Drawing Sheets

U.S. PATENT DOCUMENTS

| | | | |
|---|---|---|---|
| 3,383,746 A | 5/1968 | Narduzzi et al. | 29/33.5 |
| 3,552,090 A | 1/1971 | Roberts et al. | 53/71 |
| 3,628,576 A | 12/1971 | Owen | 141/65 |
| 4,064,296 A | 12/1977 | Bornstein et al. | 428/35 |
| 4,119,267 A | 10/1978 | Kydonieus | 229/53 |
| 4,120,716 A | 10/1978 | Bonet | 156/272 |
| 4,136,205 A | 1/1979 | Quattlebaum | 426/412 |
| 4,239,111 A | 12/1980 | Conant et al. | 206/484 |
| 4,267,960 A | 5/1981 | Lind et al. | 229/55 |
| 4,278,738 A | 7/1981 | Brax et al. | 428/515 |
| 4,285,998 A | 8/1981 | Thibodeau | 428/35 |
| 4,302,565 A | 11/1981 | Goeke et al. | 526/88 |
| 4,302,566 A | 11/1981 | Karol et al. | 526/125 |
| 4,399,180 A | 8/1983 | Briggs et al. | 428/212 |
| 4,425,268 A | 1/1984 | Cooper | 524/110 |
| 4,452,835 A | 6/1984 | Vasudevan | 428/35 |
| 4,456,646 A | 6/1984 | Nishimoto | 428/518 |
| 4,457,960 A | 7/1984 | Newsome | 428/35 |
| 4,534,984 A | 8/1985 | Kuehne | 426/412 |
| 4,539,236 A | 9/1985 | Vilutis | 428/35 |
| 4,616,472 A * | 10/1986 | Owensby et al. | 53/459 |
| 4,617,241 A | 10/1986 | Mueller | 428/520 |
| 4,629,064 A | 12/1986 | Barner | 206/204 |
| 4,662,521 A | 5/1987 | Moretti | 206/484.2 |
| 4,724,185 A | 2/1988 | Shah | 428/339 |
| 4,755,403 A | 7/1988 | Ferguson | 428/35 |
| 4,765,857 A | 8/1988 | Ferguson | 156/229 |
| 4,770,731 A | 9/1988 | Ferguson | 156/229 |
| 4,801,486 A | 1/1989 | Quacquarella et al. | 428/34.9 |
| 4,879,430 A | 11/1989 | Hoffman | 428/35.1 |
| 4,890,936 A | 1/1990 | Cooper | 383/109 |
| 4,975,688 A | 12/1990 | Gonzales | 340/693 |
| 5,020,922 A | 6/1991 | Schirmer | 383/119 |
| 5,057,065 A | 10/1991 | Buchman | 493/194 |
| 5,206,075 A | 4/1993 | Hodgson, Jr. | 428/216 |
| 5,234,731 A | 8/1993 | Ferguson | 428/34.9 |
| 5,236,728 A | 8/1993 | Locke et al. | 426/307 |
| 5,241,031 A | 8/1993 | Mehta | 526/348.1 |
| 5,272,236 A | 12/1993 | Lai et al. | 526/348.5 |
| 5,278,272 A | 1/1994 | Lai et al. | 526/348.5 |
| 5,302,402 A | 4/1994 | Dudenhoeffer et al. | 426/129 |
| 5,376,394 A | 12/1994 | Dudenhoeffer et al. | 426/415 |
| 5,447,591 A | 9/1995 | Ennis | 156/229 |
| 5,534,276 A | 7/1996 | Ennis | 426/127 |
| 5,540,646 A | 7/1996 | Williams et al. | 493/210 |
| 5,545,419 A | 8/1996 | Brady et al. | 426/129 |

\* cited by examiner

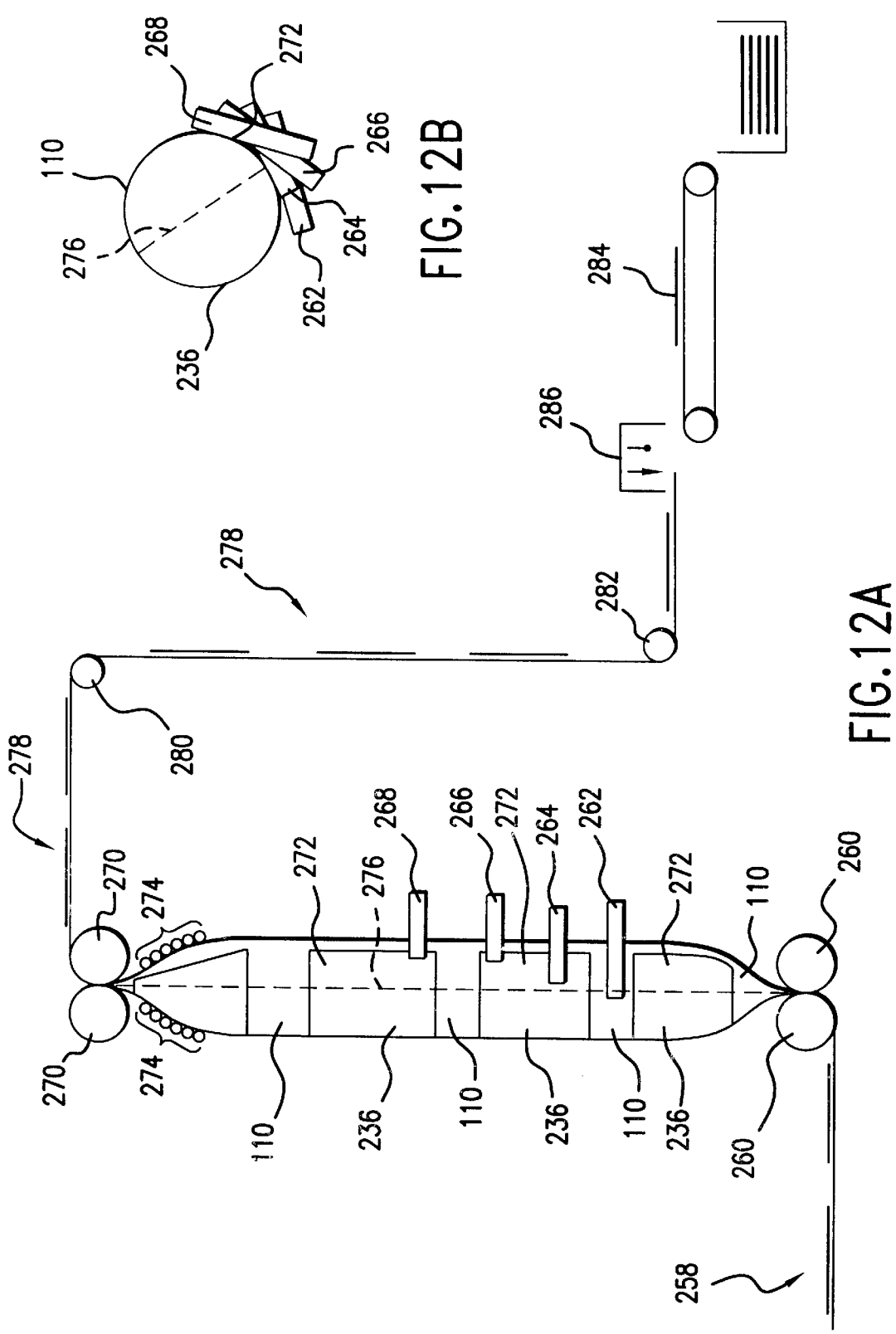

PATCH BAG HAVING WRAP-AROUND PATCH

FIELD OF THE INVENTION

The present invention relates to patch bags, particularly patch bags used in the packaging of bone-in meat products. Such patch bags have a protective patch adhered directly thereto, the protective patch preventing bone puncture, or reducing the likelihood of bone puncture.

BACKGROUND OF THE INVENTION

Bags having patches adhered thereto have for some time been used in the packaging of various bone-in meat products. The patches provide additional resistance to puncture of the bag by the bone in the meat product. In this manner, fewer "leakers" result, and the possibility of contamination is also reduced. A variety of patch bags have been used for the packaging of a variety of meat products. Most of the patch bags have been end-seal patch bags having one or two patches adhered to the outside surface of the bag.

One of the patch bags which has been commercialized for several years is a patch which covers a portion of one of the side edges of the bag. However, the patch extends over less than 50 percent of the distance around the bag because the entirety of the patch is applied to a single lay-flat side of a film tubing which is thereafter converted into a bag via sealing and cutting. However, some bone-in meat cuts present bones which impact the bag at a variety of points which, taken together, require the presence of more than one patch. The presence of a second patch presents an efficiency challenge in that it is difficult to adhere patches to opposite sides of the tubing in a single pass, thereby necessitating a less-efficient process which utilizes multiple passes. Moreover, the presence of the second patch presents a technical challenge in that the second patch must not only be registered and aligned with respect to the bag tubing film, the second patch must also be registered with respect to the first patch which is on the other side of the bag.

Another patch bag which has also been commercialized for several years is an end-seal patch bag having one patch adhered to each lay-flat side of the bag, with the patches covering across the entire width of the bag, each of the patches overhanging each of the bag side edges. Those patch portions which overhang the side edges are adhered to one another. Thus, the combination of the two patches provides effective patch coverage around the entire bag. However, producing this bag presents even greater the technical registration and alignment challenges than for the two-patch bag described above, because of exposed adhesive if the two patches are less than perfectly aligned with one another. Moreover, additional technical challenges are present due to the presence of exposed adhesive on the extending portions of the first patch applied, i.e., before the second patch is applied, as well as from excess adhesive which exudes from between the extended portions of the patches.

SUMMARY OF THE INVENTION

It would be desirable to avoid the technical and efficiency challenges described above, while providing ample patch coverage for bone-in meat cuts which impact the bag in areas which require a patch which covers more than 50 percent of the distance around the bag. Applicants have invented a patch bag having a patch which provides patch coverage more than 50 percent of the distance around the bag. Applicants have also invented a process for making a patch bag which, through the use of a patch which covers more than 50 percent of the distance around the bag, avoids the efficiency challenges and technical challenges in the making of the patch bags described above.

As a first aspect, the present invention pertains to an end-seal patch bag comprising a seamless, tubular bag having an open top, a first side edge, a second side edge, a bottom edge, an end seal, and a patch adhered to the bag, wherein the patch extends across more than 50 percent of a total transverse cross-sectional surface of the bag. Preferably, the patch extends across at least 50 percent of a first lay-flat side of the bag. Preferably, the patch also extends across at least 10 percent of a second lay-flat side of the bag; more preferably, at least 15 percent of the second lay-flat side of the bag; still more preferably, at least 20 percent of the second lay-flat side of the bag, yet still more preferably, at least 25 percent of the second lay-flat side of the bag; even yet still more preferably, at least 30 percent of the second lay-flat side of the bag; even more preferably, at least 35 percent of the second lay-flat side of the bag.

Preferably, the bag comprises a first heat-shrinkable film and the patch comprises a second heat-shrinkable film. Preferably, the first heat-shrinkable film is a multilayer film and the second heat-shrinkable film is a multilayer film. Preferably, the first heat-shrinkable film comprises: (A) an outside abuse layer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer; (B) an inner $O_2$-barrier layer comprising at least one member selected from the group consisting of ethylene/vinyl alcohol copolymer, polyvinylidene chloride, polyamide, polyester, polyacrylonitrile; and, (C) an inside sealant layer comprising at least one member selected from the group consisting of thermoplastic polyolefin, thermoplastic polyamide, thermoplastic polyester, and thermoplastic polyvinyl chloride.

Preferably, the second biaxially-oriented, heat-shrinkable film comprises at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer. More preferably, the second biaxially-oriented, heat-shrinkable film comprises at least one member selected from the group consisting of linear low density polyethylene, homogeneous ethylene/alpha-olefin copolymer, and ethylene/vinyl acetate copolymer.

Preferably, the patch is adhered to the bag with an adhesive. Although the patch can be adhered to an inside surface of the bag or an outside surface of the bag, preferably the patch is adhered to the outside surface of the bag, so that the product placed in the bag is not exposed to the adhesive used to adhere the patch to the bag.

Although more than one patch can be adhered to the end-seal bag, preferably only one patch is adhered to the bag. Although a single patch extends more than half way around the end-seal bag, the patch can extend across part or all of a first lay-flat side of the end-seal bag. Preferably, the patch extends across the entirety of the first lay-flat side of the end-seal bag, as well as covers a portion of the length of both side edges of the end-seal bag, as well as covers two discrete regions of the second lay-flat side of the end-seal bag.

The bag film and/or the patch film can comprise a crosslinked polymer network. Preferably, both the bag film and the patch film comprise a crosslinked polymer network.

While the patch can have a length less than, equal to, or even greater than the length of the bag, preferably the patch has length which is less than the length of the bag. Although the patch can extend to the top edge of the bag and/or to the bottom edge of the bag, preferably the patch does not extend to either the top edge of the bag or the bottom edge of the bag, so that an end-seal can be made (without having to seal through the patch film) across the bag in an uncovered region near the bottom edge of the bag, and so that a top seal can be made (again, without having to seal through the patch film) across the bag in an uncovered region near the top edge of the bag.

Although the patch extends more than half way around the bag, the patch can extend less than all the way around the bag, or even all the way around the bag. If the patch extends around the entirety of the bag, the patch can have a width in excess of the circumference of the bag, with the excess patch width being taken up in the patch being adhered to itself If this excess patch is adhered to itself, it can be adhered in a lap configuration or in a fin configuration, i.e., one side of the patch film is adhered to the other side of the patch film (a lap configuration), or the adherence can be of the same side of the patch film to itself (a fin configuration).

As a second aspect, the invention pertains to a side-seal patch bag comprising a tubular bag having an open top, a seamless bottom edge, a first side seal, and a second side seal, the tubular bag having a patch adhered thereto, the patch coveting at least a portion of the bottom edge of the bag, the patch extending across more than 50 percent of a total longitudinal cross-sectional surface of the bag. Preferred side-seal bags in accordance with the present invention are analogous to preferred end-seal bags in accordance with the present invention.

As a third aspect, the present invention is directed to a process for making a patch bag, comprising: (A) adhering a first portion of a patch film across a first lay-flat side of a seamless, tubular, lay-flat bag film, the patch film being adhered to the first lay-flat side so that only a first portion of the patch film is adhering thereto, with a second portion of the patch film extending outwardly from the first side edge of the tubular, lay-flat bag film; (B) wrapping the second portion of the patch film around the first side edge of the tubular bag film, so that the second portion of the patch film is adhered to a first region of a second lay-flat side of the tubular bag film; and (C) sealing the tubular bag film to itself so that a patch bag is formed.

Preferably, the wrapping of the second portion of the patch film around the first side edge of the tubular bag film is carried out by inflating the tubular bag film and passing the inflated tubular bag film against a contact roll which presses the second portion of the patch against the tubular bag film. The contact rolls can be smooth rolls (e.g., made of polished metal), brush rolls, or even blowers. Alternatively, nip rolls having a length less than lay-flat width of the inflated tubular bag film could be used, so that the inflated bubble would be contiguous.

Although the tubular bag film could be continuously or intermittently forwarded to the contact roll, preferably the tubular bag film is continuously forwarded to the contact roll. Preferably, the inflated tubular bag film is maintained in a vertical orientation. Alternatively, the inflated tubular bag film could be maintained in a horizontal orientation during the wrapping of the second portion of the patch against the inflated tubular bag film.

Although one or more contact rolls can be used to wrap the second portion of the patch film around the first side edge of the tubular bag film while the bag film is inflated, preferably a plurality of contact rolls are used to sequentially wrap the patch film around the side edge of the bag film. The contact rolls can be driven or freewheeling. For reasons of simplicity and economy, preferably, the contact rolls are freewheeling. If the contact rolls are driven, preferably they are driven so as to urge film further in the direction of its movement, so as to achieve a smooth wrapping of the patch film to the bag film.

If a first portion of the patch film extends across an entirety of the first lay-flat side edge of the tubular bag film, and a second portion of the patch film extends outwardly from the first lay-flat side edge of the tubular bag film, and a third portion of the patch film extends outwardly from the second lay-flat side edge of the tubular bag film, the process can utilize two separate sets of contact rolls to wrap each of (a) the second portion of the patch film across the first bag side edge and onto the first region of the second lay-flat side of the bag tubing, and (b) the third portion of the patch film across the second side edge and onto the second region of the second lay-flat side of the bag tubing, respectively.

The adhesion of the patch to the bag film can be accomplished and/or enhanced by subjecting the patch film to at least one member selected from the group consisting of corona treatment, primer application, and flame treatment. Alternatively or additionally, a surface of the tubular bag film can be subjected to at least one member selected from the group consisting of corona treatment, primer application, and flame treatment. Of course, preferably the surface subjected to such treatment is the surface to which the patch is to be adhered.

The adhesive can be continuously applied to a continuous patch film which is thereafter cut into discrete pieces which are adhered onto separate locations on a continuous bag film tubing, with the resulting laminate thereafter being sealed and cut to form patch bags.

The sealing and cutting can be carried out so that an end-seal patch bag is produced, and/or so that a side-seal patch bag is produced.

The process can be carried out so that the patch has a total width of from about 105 to 250 percent of the width of the lay-flat bag film; more preferably, from about 105 to 210 percent of the width of the lay-flat bag film, still more preferably, from about 105 to 180 percent of the width of the lay-flat film.

As a fourth aspect, the present invention pertains to a packaged product, comprising: (A) a package comprising an end-seal patch bag comprising a seamless tubular bag having a first side edge, a second side edge, a bottom edge, a bottom end seal, and a top end seal, and a patch adhered to the bag, wherein the patch extends across more than 50 percent of a total transverse cross-sectional surface of the bag; and, (B) a meat product in said package, the meat product comprising bone. Preferably, the meat product comprises at least one member selected from the group consisting of poultry, pork, beef (including veal), lamb, goat, horse, and fish; more specifically, ham, sparerib, picnic, back rib, short loin, short rib, whole turkey, pork loin.

As a fifth aspect, the present invention pertains to a packaged product comprising: (A) a package comprising an side-seal patch bag comprising a tubular bag having a seamless bottom edge, a first side seal, a second side seal, and a top seal, the tubular bag having a patch adhered thereto, the patch covering at least a portion of the bottom edge of the bag, the patch extending across more than 50 percent of a total longitudinal cross-sectional surface of the bag; and (B) a meat product in said package, the meat product comprising bone. Preferably, the meat product is as described for the fourth aspect of the present invention.

BRIEF DESCRIPTION OF THE DRAWINGS

FIG. 12A, which is a continuation of the FIG. 11 schematic view, illustrates a schematic view of a second portion of a preferred process for wrapping and adhering an outwardly-extending portion of the patch film around the tubular bag film. FIG. 12B is a view from above of a portion of the process illustrated in FIG. 12A.

DETAILED DESCRIPTION OF THE INVENTION

Figure 1:
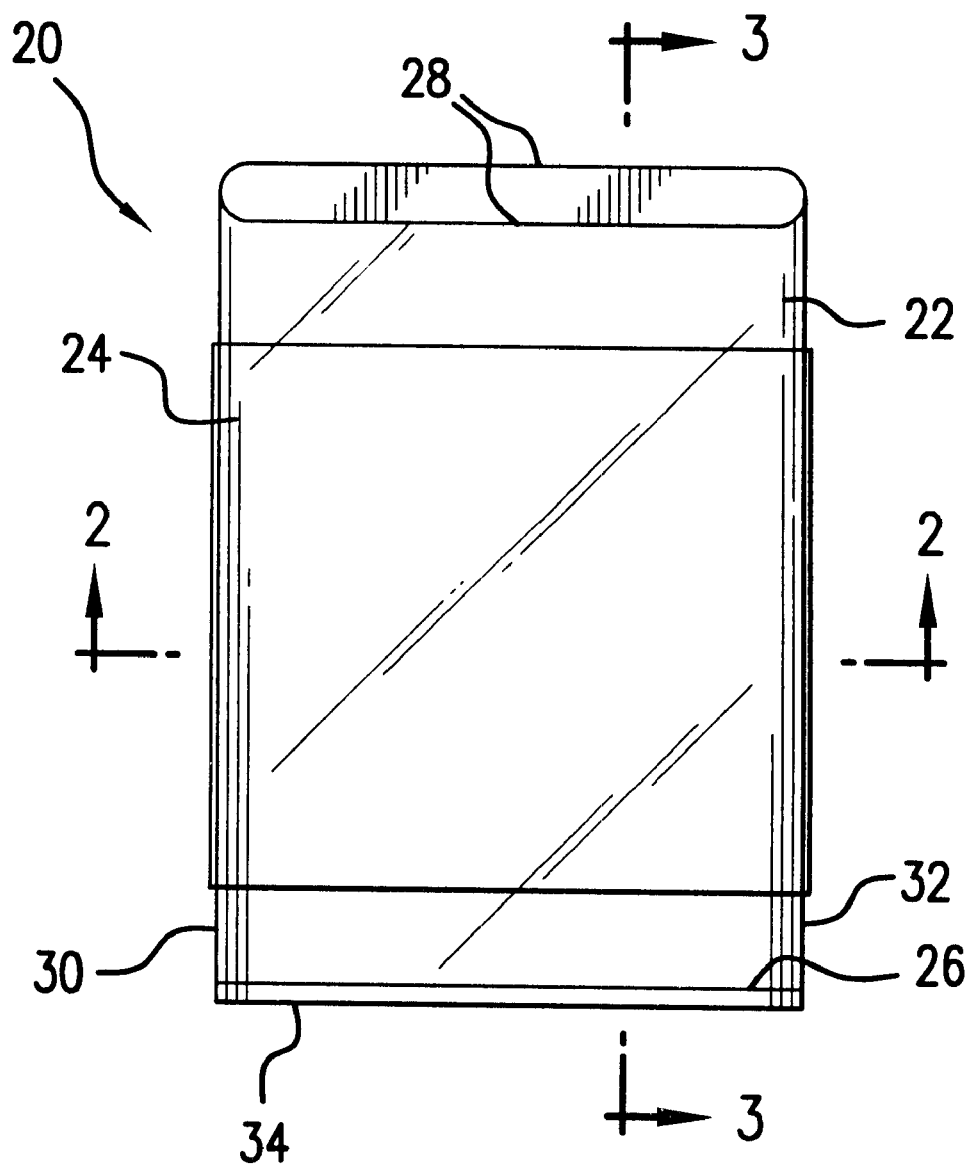
FIG. 1 illustrates a schematic view of a preferred end-seal patch bag according to the present invention, in a lay-flat view.

As used herein, for an end-seal bag, the phrase "bag length" refers to the length of the empty, lay-flat bag, measured from the top edge to the bottom edge. Thus, the bag length of end-seal bags runs from the edge of the bag at the open top end of the bag, through to the bottom bag edge below the end seal, while the bag is in a lay-flat configuration. Likewise, for side-seal bags, the phrase "bag length" refers to the distance from the open top of the bag to the bottom (folded, usually creased) edge of the bag, while the bag is in a lay-flat configuration. The length of a side-seat bag is transverse to the machine direction of film production and processing, whereas the length of an end-seal bag is in the machine direction of film production and processing.

As used herein, the phrase "bag width" refers to the size, i.e., length, of the lay-flat bag in the transverse direction, i.e., across the bag. Thus, the bag width of an end-seal bag runs from the first bag side edge (folded, usually creased) to the second bag side edge (folded, usually creased); the bag width of a side-seal bag runs from edges of the bag at one side to the edges of the bag film at the other side, i.e., including the two side seals.

As used herein, the phrase "uncovered portion of the bag" refers to a portion of the bag which is not covered by a patch, i.e., a portion of the bag having both its inside surface and its outside surface not adhered to, or otherwise covered by, one or more patches.

As used herein, the phrase "patch overhang region", or "overhang", refers to that portion of a patch which extends beyond: (a) a side edge of the bag to which the patch is adhered, or (b) a bottom edge of the bag to which the patch is adhered, when the bag is in a lay-flat configuration, i.e., when the factory seal(s) is flat against a surface on which the bag has been placed.

The "factory seal" includes any and all seals necessary to convert a film tubing or flat film into a bag having an open top. Such seals are made at the bag-making factory, and hence are herein termed to be "factory seals".

The bag "side edge," and the bag "bottom edge", beyond which a patch may overhang, is usually formed by a mere "fold" in the bag. Although the bag need not have a crease at its edges, in reality the side edges of and end-seal bag (and the bottom edge of a side-seal bag) are usually creased by processing rollers in the manufacture of the tubing from which the respective bag is produced. Bag side, bottom, and top-edges are determined by placing an empty bag on a flat supporting surface, with the end-seal of an end-seal bag (or the side-seals of a side-seal bag) being flat against the supporting surface. The perimeter of the bag in this lay-flat configuration determines the location of the bag side edges, the bag bottom edge, and the bag top edge. The designation of a "first" side edge and a "second" side edge are not fixed, but are readily apparent from the full context of the discussion at hand.

As described herein, the patch extends more than half way around the tubing from which the bag is made. In an end-seal bag, this means that the resulting bag has the patch adhered more than half way around the transverse cross-sectional surface (i.e., circumference, i.e., perimeter) of the bag. For a side-seal bag, this means that the resulting bag has the patch adhered more than half way around the longitudinal circumference (longitudinal perimeter) of the bag, considering the bag as having a continuous longitudinal circumference (which in reality it does not have, because of the cut made to produce the open top of the side seal bag.

As used herein, the term "film" is used in a generic sense to include plastic web, regardless of whether it is film or sheet. Preferably, films of and used in the present invention have a thickness of 0.25 mm or less. As used herein, the term "package" refers to packaging materials used in the packaging of a product.

As used herein, the phrases "seal layer", "sealing layer", "heat seal layer", and "sealant layer", refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers adjacent this sealant layer, the inside layer frequently also serving as a food contact layer in the packaging of foods. In general, a sealant layer to be sealed by heat-sealing can comprise any thermoplastic polymer; preferably, the heat-sealing layer comprises, for example, thermoplastic polyolefin, thermoplastic polyamide, thermoplastic polyester, and thermoplastic polyvinyl chloride; more preferably, thermoplastic polyolefin; still more preferably, thermoplastic polyolefin having less than 60 weight percent crystallinity. Preferred sealant compositions are the same as the compositions for the abuse layer, as set forth below.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a heated bar, hot air, infrared radiation, ultrasonic sealing, etc.

As used herein, the term "barrier", and the phrase "barrier layer", as applied to films and/or film layers, is used with reference to the ability of a film or film layer to serve as a barrier to one or more gases. Oxygen (i.e., $O_2$) barrier layers can comprise, for example, ethylene/vinyl alcohol copolymer, polyvinyl chloride, polyvinylidene chloride, polyamide, polyester, polyacrylonitrile, etc., as known to those of skill in the art; preferably, the oxygen barrier layer comprises ethylene/vinyl alcohol copolymer, polyvinyl chloride, polyvinylidene chloride, and polyamide; more preferably, vinylidene chloride/methyl acrylate copolymer, as known to those of skill in the art.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality. Abuse layers can comprise any polymer, so long as the polymer contributes to achieving an integrity goal and/or an appearance goal; preferably, abuse layers comprise polymer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer, etc. as known to those of skill in the art; more preferably, ethylene/vinyl acetate copolymer and ethylene/alpha-olefin copolymer having a density of from about 0.91 to 0.93; still more preferably, the abuse layer of the bag film comprises 85–100 weight percent ethylene/vinyl acetate copolymer, and 0–15 weight percent LLDPE, while the still more preferred abuse layer of the patch film comprises 85–100 weight percent LLDPE and 0–15 weight percent ethylene/vinyl acetate copolymer having a vinyl acetate content of about 9 percent.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrase "skin layer" refers to an outside layer of a multilayer film in packaging a product, this skin layer being subject to abuse. Accordingly, the preferred polymers for the skin layer are the same as the preferred polymers for the abuse layer.

As used herein, the phrase "tie layer" refers to any internal layer having the primary purpose of adhering two layers to one another. Tie layers can comprise any polymer having a polar group grafted thereon, so that the polymer is capable of covalent bonding to polar polymers such as polyamide and ethylene/vinyl alcohol copolymer; preferably, tie layers comprise at least one member selected from the group consisting of polyolefin, modified polyolefin, ethylene/vinyl acetate copolymer, modified ethylene/vinyl acetate copolymer, and homogeneous ethylene/alpha-olefin copolymer; more preferably, tie layers comprise at least one member selected from the group consisting of anhydride modified grafted linear low density polyethylene, anhydride grafted low density polyethylene, homogeneous ethylene/alpha-olefin copolymer, and anhydride grafted ethylene/vinyl acetate copolymer.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc. Preferably, bulk layers comprise polyolefin; more preferably, at least one member selected from the group consisting of ethylene/alpha-olefin copolymer, ethylene/alpha-olefin copolymer plastomer, low density polyethylene, and linear low density polyethylene.

As used herein, "EVOH" refers to ethylene/vinyl alcohol copolymer. EVOH includes saponified or hydrolyzed ethylene/vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "lamination", the term "laminate", and the phrase "laminated film", refer to the process, and resulting product, made by bonding together two or more layers of film or other materials. Lamination can be accomplished by joining layers with adhesives, joining with heat and pressure, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". A film which is produced by both drawing and stretching is referred to as a "biaxially oriented" film. For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymenizes in a higher weight percent than the second monomer, and the second monomer copolymerizes in a higher weight percent than the third monomer, etc.

As used herein, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "polymerization units" derived from the monomers from which the copolymer is produced.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER (TM) ethylene/alpha-olefin copolymers produced by Mitsui Petrochemical Corporation), heterogeneous polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum, as is disclosed in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. Homogeneous ethylene/alpha-olefin copolymer generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymer are generally greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymer (narrow composition distribution as assessed by CDBI values generally above 70%) from VLDPE, which has a broad composition distribution as assessed by CDBI values generally less than 55%. The CDBI of a copolymer is readily calculated from data obtained from techniques known in the art, such as, for example, temperature rising elution fractionation as described, for example, in Wild et. al., J. Poly. Sci. Poly. Phys. Ed., Vol. 20, p.441 (1982). Preferably, the homogeneous ethylene/alpha-olefin copolymers have a CDBI greater than about 70%, i.e., a CDBI of from about 70% to 99%. In general, homogeneous ethylene/alpha-olefin copolymer also exhibits a relatively narrow melting point range, in comparison with "heterogeneous copolymer", i.e., polymer having a CDBI of less than 55%. Homogeneous ethylene/alpha-olefin copolymer can exhibits an essentially singular melting point characteristic, with a peak melting point ($T_m$), as determined by Differential Scanning Colorimetry (DSC), of from about 60° C. to 110° C. Preferred homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Yet still more preferably, the alpha-olefin comprises octene-1, and/or a blend of hexene-1 and butene-1.

Processes for preparing and using homogeneous polymers are disclosed in U.S. Pat. No. 5,206,075, to Hodgson, U.S. Pat. No. 5,241,031, to Mehta, each of which is hereby incorporated by reference thereto, in its respective entirety. Further details regarding the production and use of homogeneous ethylene/alpha-olefin copolymers are disclosed in PCT International Publication Number WO 90/03414, to Exxon Chemical Patents, Inc., and PCT International Publication Number WO 93/03093, to Meka et al., each of which designates Exxon Chemical Patents, Inc. as the Applicant, and each of which are hereby incorporated by reference thereto, in their respective entireties. Still another genus of homogeneous ethylene/alpha-olefin copolymers is disclosed in U.S. Pat. No. 5,272,236, to LAI, et. al., and U.S. Pat. No. 5,278,272, to LAI, et. al., each of which is hereby incorporated by reference thereto, in its respective entirety.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamnide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE), and homogeneous polymers such as metallocene catalyzed polymers such as EXACT (TM) resins obtainable from the Exxon Chemical Company, and TAFMER (TM) resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as substantially linear homogeneous long chain branched ethylene/alpha-olefin copolymers available from the Dow Chemical Company, known as AFFINITY (TM) resins, are also included as another type of homogeneous ethylene alpha-olefin copolymer which can be used in the patch bag of the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film. The phrase "inside layer" is also used with respect to various, structures, such as tubing, bags, casings, etc., in which the outer film layer which is inside with respect to the tubing, bag, casing, etc. structure.

As used herein, the phrase "outside layer" refers to the outer layer, of a multilayer film packaging a product, which is furthest from the product relative to the other layers of the multilayer film. The phrase "outside layer" is also used with respect to various structures, such as tubing, bags, casings, etc., in which the outer film layer which is the outside film layer with respect to the tubing, bag, casing, etc. structure.

As used herein, the term "adhered" is inclusive of films which are directly adhered to one another using a heat seal or other means, as well as films which are adhered to one another using an adhesive which is between the two films.

As used herein, the phrase "directly adhered", as applied to film layers, is defined as adhesion of a subject film layer to an object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be present between the subject layer and one or more of the layers the subject layer is between.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

Although the films used in the patch bag according to the present invention can be monolayer films or multilayer films, the patch bag comprises at least two films laminated together. Preferably, the patch bag is comprised of films which together comprise a total of from 2 to 20 layers; more preferably, from 2 to 12 layers; and still more preferably, from 4 to 9 layers.

Figure 2:
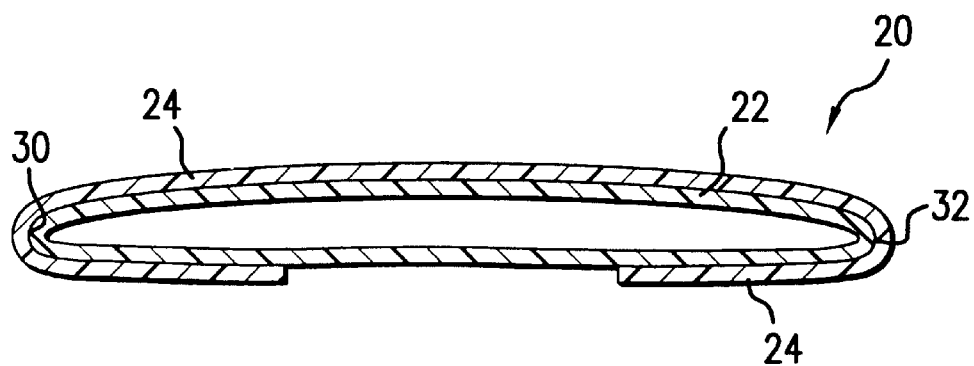
FIG. 2 illustrates an enlarged transverse cross-sectional view of the end-seal patch bag illustrated in FIG. 1, taken through section 2—2 of FIG. 1.
Figure 3:
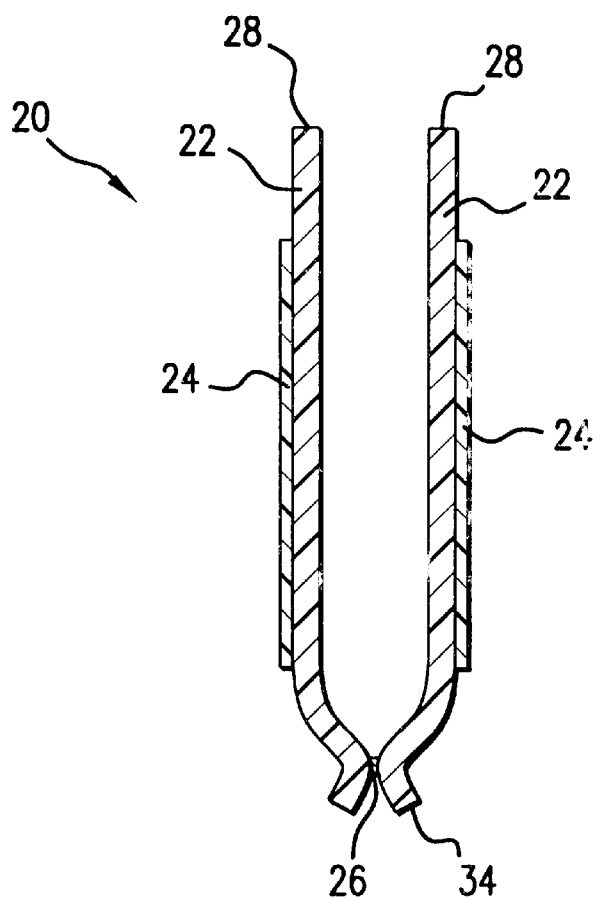
FIG. 3 illustrates an enlarged (but shortened) longitudinal cross-sectional view of the end-seal patch bag illustrated in FIG. 1, taken through section 3—3 of FIG. 1.

FIG. 1 illustrates a preferred end-seal patch bag 20 according to the present invention, in a lay-flat configuration; FIG. 2 illustrates a transverse cross-sectional view of patch bag 20 taken through section 2—2 of FIG. 1; and, FIG. 3 illustrates a longitudinal cross-sectional view of patch bag 20 taken through section 3—3 of FIG. 1. Viewing FIGS. 1, 2, and 3 together, patch bag 20 comprises bag 22, wrap-around patch 24, end-seal 26, bag top edge 28, bag first side edge 30, bag second side edge 32, and bag bottom edge 34. As is apparent from FIG. 2, a first portion wrap-around patch 24 is adhered to a first lay-flat side of patch bag 20, while second and third portions of patch 24 have been wrapped-around to cover separate portions of the second lay-flat side of patch bag 20.

Although it is possible to size patch 24 wider than illustrated in FIG. 2, and to wrap patch 24 around the entirety of bag 22, in the embodiment illustrated in FIGS. 1–3, patch 24 does not wrap around the entirety of end-seal bag 22. In a relatively high-speed commercial manufacturing process, although to-date it has been found to be difficult to wrap a single patch 24 all the way around the bag 22, it has been discovered that patch 24 can be wrapped around bag 22 while patch 24 has a width of from about 55 to 75 percent of the distance around a bag.

Figure 4:
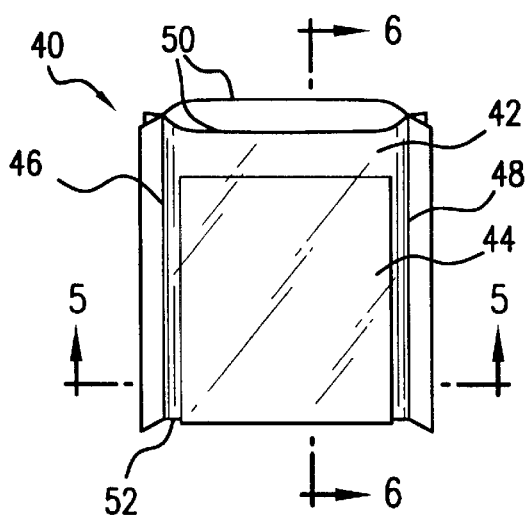
FIG. 4 illustrates a schematic view of a preferred side-seal patch bag according to the present invention, in a lay-flat view.
Figure 5:
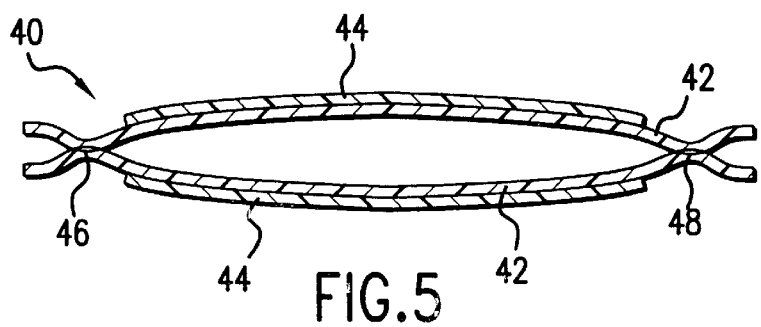
FIG. 5 illustrates a transverse cross-sectional view of the side-seal patch bag illustrated in FIG. 4, taken through section 5–5 of FIG. 1.
Figure 6:
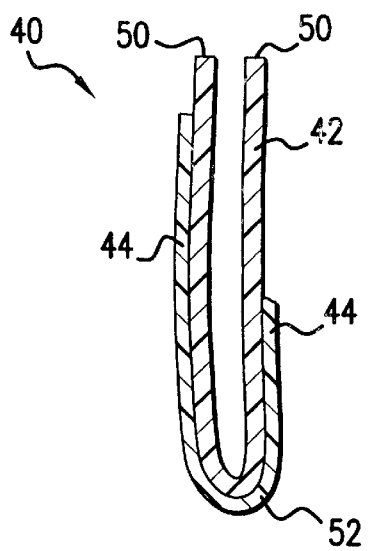
FIG. 6 illustrates a longitudinal 1 cross-sectional view of the side-seal patch bag illustrated in FIG. 4, taken through section 6—6 of FIG. 4.

FIG. 4 illustrates, in lay-flat configuration, a preferred side-seal patch bag 40 in accordance with the present invention. FIG. 5 illustrates a transverse cross-sectional view of patch bag 40 taken through section 5—5 of FIG. 4; and, FIG. 6 illustrates a longitudinal cross-sectional view of patch bag 40 taken through section 6—6 of FIG. 4. Viewing FIGS. 4, 5, and 6 together, side-seal patch bag 40 comprises bag 42, wrap-around patch 44, side-seals 46 and 48, bag top edge 50, and, bag bottom edge 52. As is apparent from FIG. 6, a first portion wrap-around patch 24 is adhered to a first lay-flat side of patch bag 20, while second and third portions of patch 24 have been wrapped-around to cover separate portions of the second lay-flat side of patch bag 20.

Although it is possible to size patch 44 longer than illustrated in FIG. 5, and to have patch 44 cover both sides of bag 42 from top edge 50 to bottom edge 52, in the embodiment illustrated in FIGS. 4 through 6, patch 44 does not wrap around the entirety of side-seal bag 40. Two reasons for this include, first, the explanation of the difficulty in wrapping so much patch length around to the other side of the bag (as described above), as well as the advantage of sealing the bag shut, with product therein, without having to make the seal through the patch film.

In general, the multilayer film(s) used in the present invention can have any total thickness desired, so long as the film provides the desired properties for the particular packaging operation in which the film is used, e.g. abuse-resistance (especially puncture-resistance), modulus, seal strength, optics, etc. Preferably, the film stock from which the patches are cut has a total thickness of from about 2 to 8 mils; more preferably, from about 3 to 6 mils. Preferably, the stock film from which the bag is formed has a total thickness of from about 1.5 to 5 mils; more preferably, about 2.5 mils. Preferably the stock film from which the bag is formed is a multilayer film having from 3 to 7 layers; more preferably, 4 layers.

FIG. 4 illustrates a cross-sectional view of preferred multilayer film 60 for use as the stock material from which patches 24 and 44 are formed. Multilayer film 60 preferably has a physical structure, in terms of number of layers, layer thickness, and layer arrangement and orientation in the patch bag, and a chemical composition in terms of the various polymers, etc. present in each of the layers, as set forth in Table 1, below.

TABLE 1

| Layer Designation | Layer Function | Chemical Composition of Layer | Layer Thickness (mils) |
|---|---|---|---|
| 62 | outside layer & puncture resistant layer | 87% LLDPE #1; 10% EVA #1; 3% antiblock masterbatch #1 | 2.0 |
| 64 | tie layer | EVA #2 | 0.7 |
| 66 | inside layer & puncture resistant layer | 87% LLDPE #1; 10% EVA #1; 3% antiblock masterbatch #1 | 2.0 |

LLDPE #1 is DOWLEX 2045 (TM) linear low density polyethylene, and can be obtained from the Dow Chemical Company of Midland, Mich. EVA #1 is ELVAX 3128 (TM) ethylene/vinyl acetate copolymer having a 9% vinyl acetate content, which can be obtained from E. I. DuPont de Nemours, of Wilmington, Del. EVA #2 is ELVAX 3175 GC (TM) ethylene/vinyl acetate copolymer having a 28% vinyl acetate content, and can be obtained from E. I. DuPont de Nemours, of Wilmington, Del. Antiblock masterbatch #1 is to be used in either of two different grades. The first grade, a clear masterbatch, is a masterbatch known as 10,075 ACP SYLOID CONCENTRATE (TM), which can be obtained from Technor Apex Co. of Pawtucket, R.I. The second grade, a creme colored masterbatch, is a masterbatch known as EPC 9621C CREAM COLOR SYLOID CONCENTRATE (TM), also obtainable from Technor Apex Co. of Pawtucket, R.I. The primary difference between these two masterbatches is that of color, which is both aesthetic, and potentially functional in that photosensor alignment means for accurate registration of the patches on the bags can utilize the coloration in the patch for detection of the location of the patch.

Although the film described above and illustrated in FIG. 7 represents a preferred structure for the patch film in the patch bag according to the present invention, a variety of preferred film structures are disclosed in U.S. Ser. No. 08/354,177, filed Dec. 12, 1994, in the name of B. C. Childress et al, entitled "PATCH BAG COMPRISING HOMOGENEOUS ETHYLENE/ALPHA-OLEFIN COPOLYMER," the entirety of which is hereby incorporated by reference thereto.

Figure 7:
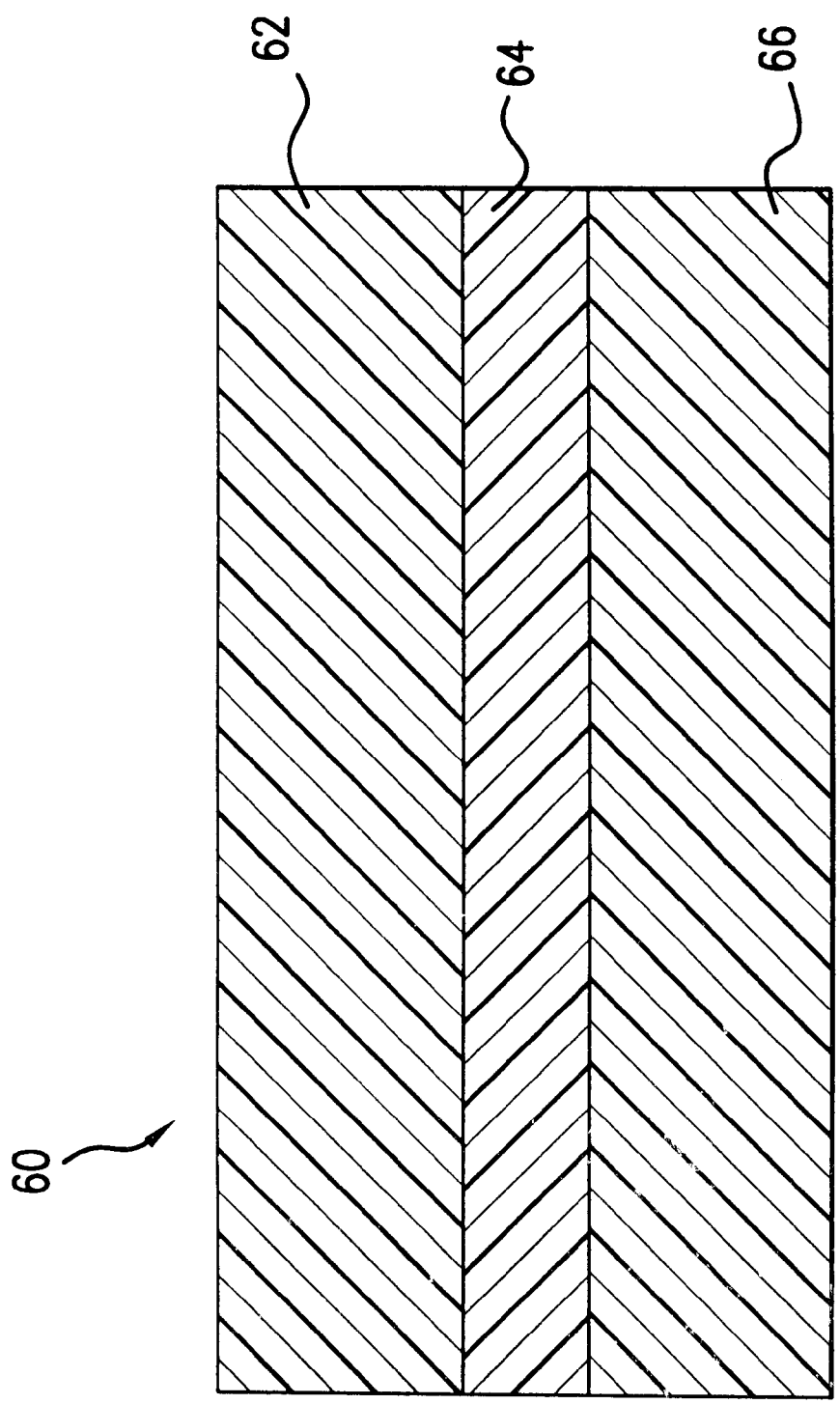
FIG. 7 illustrates a longitudinal cross-sectional view of a preferred multilayer film suitable for use as the patch film in the patch-bags of FIGS. 1–6.
Figure 8:
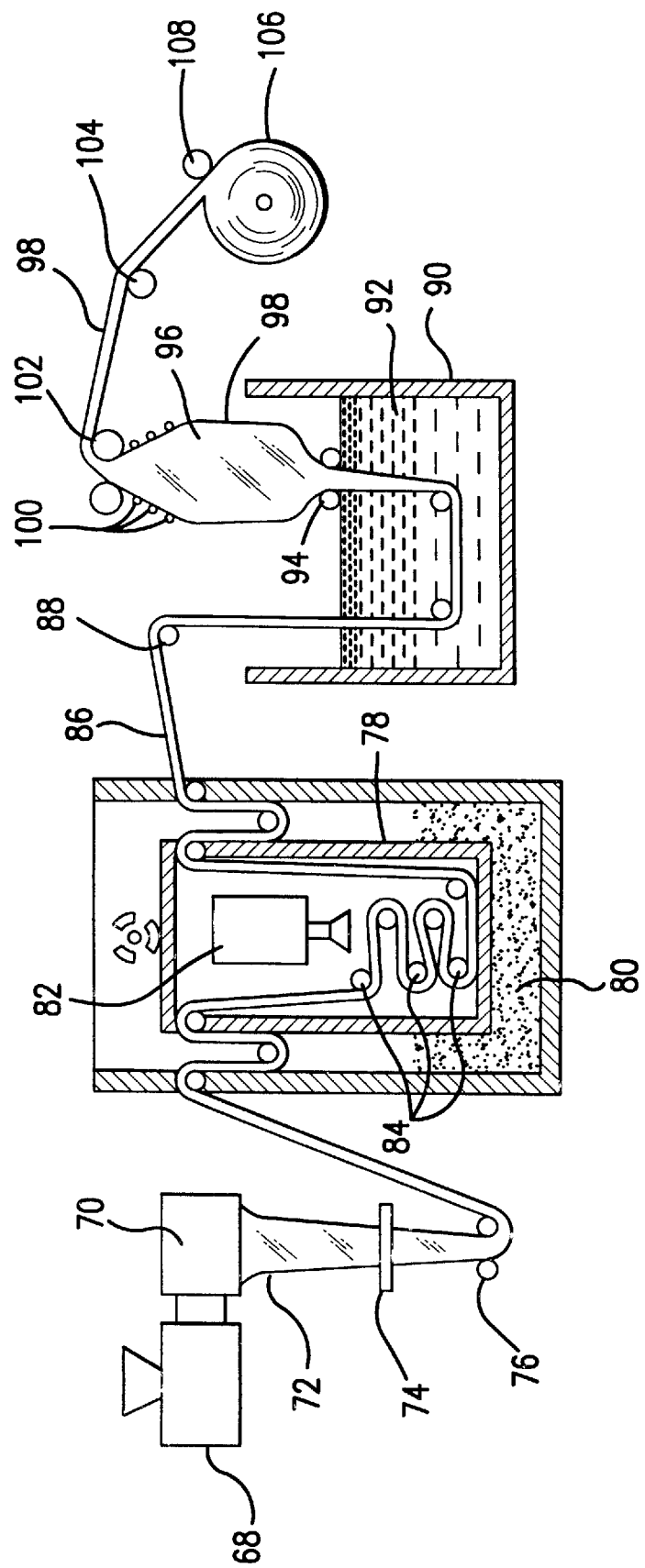
FIG. 8 illustrates a schematic view of a preferred process for making the multilayer film illustrated in FIG. 7.

FIG. 8 illustrates a schematic of a preferred process for producing the multilayer film 60 illustrated in FIG. 7. In the process illustrated in FIG. 8, solid polymer beads (not illustrated) are fed to a plurality of extruders 68 (for simplicity, only one extruder is illustrated). Inside extruders 68, the polymer beads are forwarded, melted, and degassed, following which the resulting bubble-free melt is forwarded into die head 70, and extruded through annular die, resulting in tubing 72 which is 5–40 mils thick, more preferably 20–30 mils thick, still more preferably, about 25 mils thick. After cooling or quenching by water spray from cooling ring 74, tubing 72 is collapsed by pinch rolls 76, and is thereafter fed through irradiation vault 78 surrounded by shielding 80, where tubing 72 is irradiated with high energy electrons (i.e., ionizing radiation) from iron core transformer accelerator 82. Tubing 72 is guided through irradiation vault 78 on rolls 84. Preferably, the irradiation of tubing 72 is at a level of about 7 MR.

After irradiation, now-irradiated tubing 86 is directed over guide roll 88, after which irradiated tubing 86 passes into hot water bath tank 90 containing hot water 92. The now collapsed irradiated tubing 86 is submersed in hot water 92 for a retention time of at least about 5 seconds, i.e., for a time period in order to bring irradiated tubing 86 up to the desired temperature, following which supplemental heating means (not illustrated) including a plurality of steam rolls around which irradiated tubing 66 is partially wound, and optional hot air blowers, elevate the temperature of irradiated tubing 86 to a desired orientation temperature of from about 240° F.–250° F. Thereafter, irradiated film 86 is directed through nip rolls 94, and bubble 96 is blown, thereby transversely stretching irradiated tubing 86. Furthermore, while being blown, i.e., transversely stretched, irradiated film 86 is drawn (i.e., in the longitudinal direction) between nip rolls 94 and nip rolls 102, as nip rolls 102 have a higher surface speed than the surface speed of nip rolls 94. As a result of the transverse stretching and longitudinal drawing, irradiated, biaxially-oriented, blown tubing film 98 is produced, this blown tubing preferably having been both stretched at a ratio of from about 1:1.5–1:6, and drawn at a ratio of from about 1:1.5–1:6. More preferably, the stretching and drawing are each performed at a ratio of from about 1:2–1.4. The result is a biaxial orientation of from about 1:2.25–1:36, more preferably, 1:4–1:16.

While bubble 96 is maintained between pinch rolls 94 and 102, blown tubing 98 is collapsed by rolls 100, and thereafter conveyed through pinch rolls 102 and across guide roll 104, and then rolled onto wind-up roll 106. Idler roll 108 assures a good wind-up.

Figure 9:
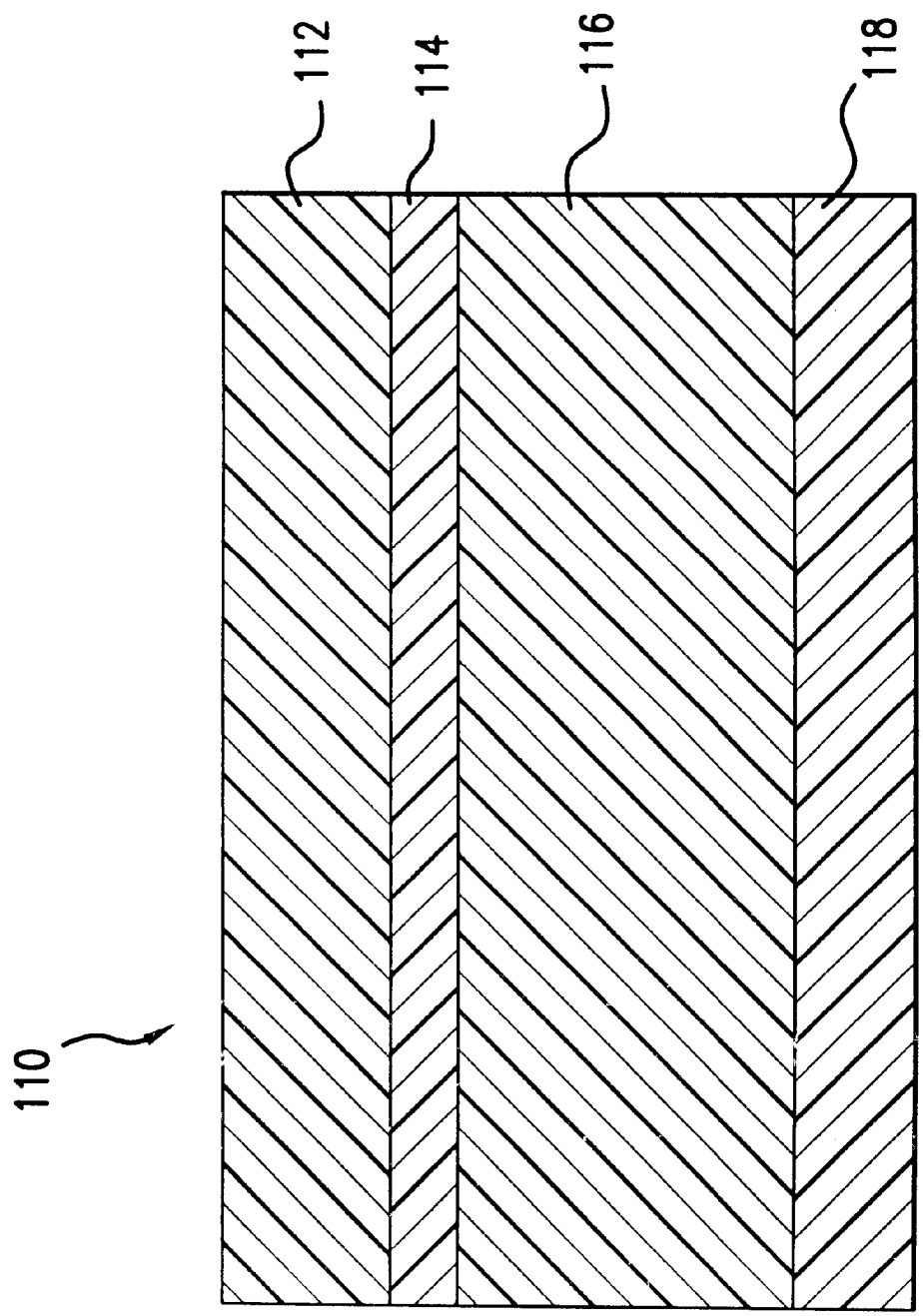
FIG. 9 illustrates a longitudinal cross-sectional view of a preferred multilayer film suitable for use as the bag film in the patch-bags of FIGS. 1–6.

FIG. 9 illustrates a cross-sectional view of preferred multilayer film 110 for use as the tubing film stock from which bags 20 and 40 are formed. Multilayer film 110 has a physical structure, in terms of number of layers, layer thickness, and layer arrangement and orientation in the patch bag, and a composition in terms of the various polymers, etc. present in each of the layers, as set forth in Table 2, below.

TABLE 2

| Layer Designation | Layer Function | Layer Composition | Layer Thickness (mils) |
|---|---|---|---|
| 112 | outside layer & abuse layer | EVA #1 | 0.56 |
| 114 | O$_2$-barrier layer | 96% VDC/MA #1; 2% epoxidized soybean oil; 2% bu-A/MA/bu-MA terpolymer | 0.2 |
| 116 | puncture-resistant layer | 80% LLDPE #1 20% EBA #1 (an irradiated layer) | 1.25 |
| 118 | sealant layer & inside layer | EVA #1 (an irradiated layer) | 0.33 |

EVA #1 is the same ethylene/vinyl acetate copolymer described above. VDC/MA #1 is SARAN MA-134 (TM) vinylidene chloride/methyl acrylate copolymer, and can be obtained from the Dow Chemical Company. The epoxidized soybean oil is PLAS-CHEK 775 (TM) epoxidized soybean oil, obtainable from the Bedford Chemical Division of Ferro Corporation, of Walton Hills, Ohio. Bu-A/MA/bu-MA terpolymer is METABLEN L-1000 (TM) butyl acrylate/methyl methacrylate/butyl methacrylate terpolymer, and can be obtained from Elf Atochem North America, Inc., of 2000 Market Street, Philadelphia, Pa. 19103. EBA #1 is EA 705–009 (TM) ethylene/butyl acrylate copolymer containing 5% butyl acrylate, obtainable from the Quantum Chemical Company of Cincinnati, Ohio. Alternatively, EBA #1 can be EA 719–009 (TM) ethylene/butyl acrylate copolymer, having a butyl acrylate content of 18.5%, also obtainable from Quantum Chemical Company.

Figure 10:
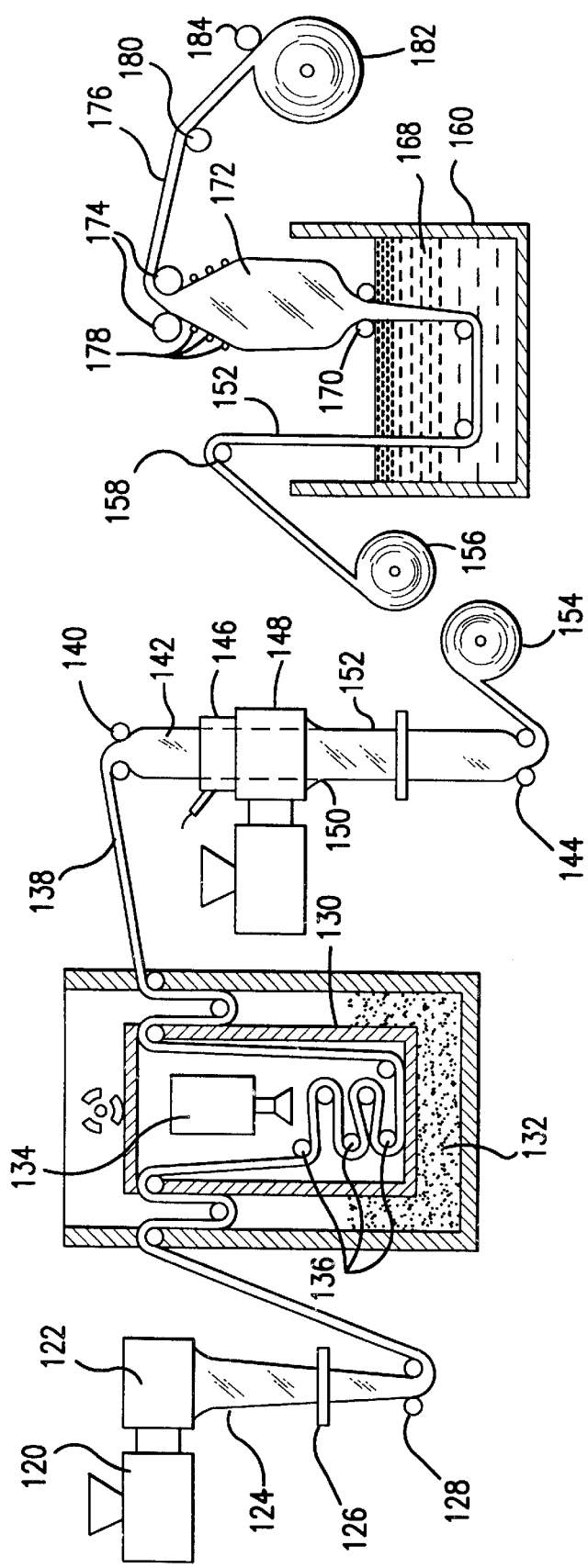
FIG. 10 illustrates a schematic view of a preferred process for making the multilayer film illustrated in FIG. 9.

FIG. 10 illustrates a schematic of a preferred process for producing multilayer film 110 illustrated in FIG. 9. In the process illustrated in FIG. 9, solid polymer beads (not illustrated) are fed to a plurality of extruders 120 (for simplicity, only one extruder is illustrated). Inside extruders 120, the polymer beads are forwarded, melted, and degassed, following which the resulting bubble-free melt is forwarded into die head 122, and is extruded through an annular die, resulting in tubing 124, which is preferably from about 10 to 30 mils thick, more preferably from about 15 to 25 mils thick. After cooling or quenching by water spray from cooling ring 126, tubing 124 is collapsed by pinch rolls 128, and is thereafter fed through irradiation vault 130 surrounded by shielding 132, where tubing 124 is irradiated with high energy electrons (i.e., ionizing radiation) from iron core transformer accelerator 134. Tubing 124 is guided through irradiation vault 130 on rolls 136. Preferably, tubing 124 is irradiated to a level of about 4.5 MR.

After irradiation, irradiated tubing 138 is directed through pre-coating nip rolls 140, following which tubing 138 is slightly inflated, resulting in trapped bubble 142. However, at trapped bubble 142, tubing 138 is not significantly drawn longitudinally, as the surface speed of post-coating nip rolls 144 is about the same as that of pre-coating nip rolls 140. Furthermore, irradiated tubing 138 is inflated only enough to provide a substantially circular tubing without significant transverse orientation, i.e., without stretching.

Slightly inflated, irradiated tubing 138 is passed through vacuum chamber 146, and thereafter forwarded through coating die 148. Second tubular film 150 is melt-extruded from coating die 148 and coated onto slightly inflated, irradiated tube 138, to form two-ply tubular film 152. Second tubular film 150 preferably comprises an $O_2$-barrier layer (preferably comprising polyvinylidene chloride), which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 152 is wound up onto windup roll 154. Thereafter, windup roll 154 is removed and installed as unwind roll 156, on a second stage in the process of making the tubing film as ultimately desired. Two-ply tubular film 152, from unwind roll 156, is unwound and passed over guide roll 158, after which two-ply tubular film 152 passes into hot water bath tank 160 containing hot water 168. The now collapsed, irradiated, coated tubular film 152 is submersed in hot water 168 (having a temperature of about 210° F.) for a retention time of at least about 5 seconds, i.e., for a time period in order to bring the film up to the desired temperature for biaxial orientation. Thereafter, irradiated tubular film 152 is directed through nip rolls 170, and bubble 172 is blown, thereby transversely stretching tubular film 152. Furthermore, while being blown, i.e., transversely stretched, nip rolls 174 draw tubular film 152 in the longitudinal direction, as nip rolls 174 have a surface speed higher than the surface speed of nip rolls 170. As a result of the transverse stretching and longitudinal drawing, irradiated, coated biaxially-oriented blown tubing film 176 is produced, this blown tubing preferably having been both stretched in a ratio of from about 1:1.5–1:6, and drawn in a ratio of from about 1:1.5–1:6. More preferably, the stretching and drawing are each performed a ratio of from about 1:2–1:4. The result is a biaxial orientation of from about 1:2.25–1:36, more preferably, 1:4–1:16. While bubble 172 is maintained between nip rolls 170 and 174, blown tubing 176 is collapsed by rollers 178, and thereafter conveyed through nip rolls 174 and across guide roll 180, and then rolled onto wind-up roll 182. Idler roll 184 assures a good wind-up.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

The patch film and/or the bag film can be printed. Preferred printed patch bags, and processes for making same, are disclosed in U.S. Pat. No. 5,447,591, to Ennis, entitled "Trap Printing Method of Bone-In Meat Containers," and U.S. Pat. No. 5,534,276, also to Ennis, entitled "Bone-In Meat Containers," both of which are hereby incorporated, in their entireties, by reference thereto. It is particularly preferred to reverse print the surface of the patch film which is to have adhesive applied thereto for adhesion adhered to the bag film.

The multilayer films used to make the patch bag of the present invention are preferably irradiated to induce crosslinking, as well as corona-treated to roughen the surface of the films which are to be adhered to one another. In the irradiation process, the film is subjected to an energetic radiation treatment, such as corona-discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 16–166 kGy, more preferably about 44–139 kGy, and still more preferably, 80–120 kGy. Preferably, irradiation is carried out by an electron accelerator and the dosage level is determined by standard dosimetry methods.

Other accelerators such as a Van der Graaf or resonating transformer may be used. The radiation is not limited to electrons-from an accelerator since any ionizing radiation may be used. The unit of ionizing radiation generally used is the rad, hereinafter referred to as "RAD", which is defined as the amount of radiation which will result in the absorption of 100 ergs of energy per gram of irradiated material. The megarad, hereinafter referred to as "MR", is one million ($10^6$) RAD. The ionizing radiation crosslinks the polymers in the film. Preferably, the film is irradiated at a level of from 2–15 MR, more preferably 2–10 MR, still more preferably, about 7 MR. As can be seen from the descriptions of preferred films for use in the present invention, the most preferred amount of radiation is dependent upon the film and its end use.

As used herein, the phrases "corona-treatment" and "corona-discharge treatment" refer to subjecting the surfaces of thermoplastic materials, such as polyolefins, to corona discharge, i.e., the ionization of a gas such as air in close proximity to a film surface, the ionization being initiated by a high voltage passed through a nearby electrode, causing oxidation and other changes to the film surface, such as surface roughness. Corona treatment of polymeric materials, disclosed in U.S. Pat. No. 4,120,716 to BONET issued Oct. 17, 1978 (hereby incorporated in its entirety by reference thereto), discloses corona treatment as oxidizing the surface of the polyethylene, thereby improving its adherence characteristics. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web increasing the adhesion of the web to the proteinaceous material. Although corona treatment is a preferred treatment of the multilayer films used to make the patch bag of the present invention, plasma treatment of the film may also be used.

The patch bag illustrated in FIGS. 1, 2, and 3 has patches which do not extend to either top edge 28 or end-seal 26. Although such a bag has areas left uncovered by patch film, these uncovered areas make formation of end-seal 26 easier, as there is no need to seal through the patch film. In addition, after product has been placed in the patch bag, it is easier to make the top seal (not illustrated) without having to seal through the patch film. Therefore, in one preferred embodiment, upper and lower regions of bag 22 are intentionally left uncovered by the patch. Alternatively, the patch could having a length which covers this bottom region and/or top region of the bag, with the bottom and/or top seal being made through the patch. Sealing through the patch is disclosed in provisional application U.S. Ser. No. 60/042664, filed Apr. 4, 1997, in the name of DePoorter et al, entitled "PATCH BAG HAVING SEAL THROUGH PATCHES," the entirety of which is hereby incorporated by reference thereto.

The patch bags illustrated in FIGS. 1 through 6 have only one bottom end seal, which is spaced a short distance down from a bottom edge of the discontinuous patch. However, one or more supplemental heat seals can be utilized in order to keep the product from puncturing the uncovered area between the heat seal and the bottom edge of the discontinuous patch. Such supplemental seals are disclosed in copending U.S. patent application Ser. No. 08/278,367, in the name of S. A. Brady et al., filed Jul. 21, 1994, entitled "PATCH BAG HAVING SUPPLEMENTAL SEAL", the entirety of which is hereby incorporated by reference thereto. Such supplemental seals are, of course, also useful in conjunction with the patch bag according to the present invention.

Figure 11:
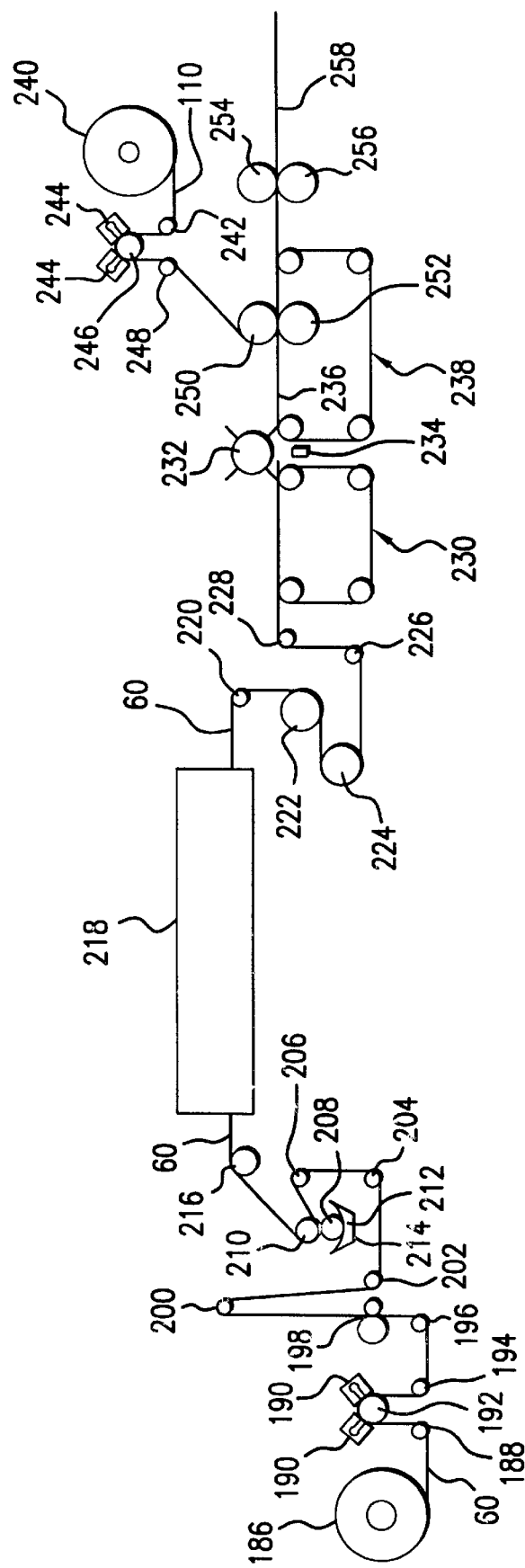
FIG. 11 illustrates a schematic view of a first portion of a preferred process for cutting the patch film and laminating the cut patches to the tubular bag film.

In the bag-making process, if an end-seal patch bag is the desired product, preferably the patch film is adhered to the tubing, after which the resulting laminate is sealed and cut so that an end-seal bag is produced. FIGS. 11 and 12 together illustrate a schematic representation of a preferred process for manufacturing a patch bag according to the present invention (e.g., a patch bag as illustrated in FIGS. 1 through 6) from the films as illustrated in FIGS. 7 and 9, which are prepared according to processes as illustrated in FIGS. 8 and 10, respectively.

In FIG. 11, patch film roll 186 supplies patch film 60. Patch film 60 is directed, by idler roll 188, to corona treatment devices 190 which subject the upper surface of patch film 60 to corona treatment as patch film 60 passes over corona treatment roll 192. After corona treatment, patch film 60 is directed, by idler rolls 194 and 196, into (optional) printing roll 198.

Patch film 60 is thereafter directed over idler rolls 200, 202, 204, and 206, after which patch film 60 is passed between a small gap (i.e., a gap wide enough to accommodate patch film 60 passing therethrough while receiving an amount of adhesive which corresponds with a dry coating (i.e., weight after drying, of about 45 milligrams per 10 square inches of patch film) between adhesive application roll 208 and adhesive metering roll 210. Adhesive application roll 208 is partially immersed in adhesive 212 supplied to trough 214. As adhesive roll 208 rotates counterclockwise, adhesive 212, picked up by the immersed surface of adhesive roll 208, moves upward, contacts, and is metered onto, the full width of one side of patch film 60, moving in the same direction as the surface of adhesive roll 208. [Examples of suitable types of adhesives include thermoplastic acrylic emulsions, solvent based adhesives and high solids adhesives, ultraviolet-cured adhesive, and electron-beam cured adhesive, as known to those of skill in the art. The presently preferred adhesive is a thermoplastic acrylic emulsion known as RHOPLEX N619 (TM) thermoplastic acrylic emulsion, obtained from the Rohm & Haas Company, at Dominion Plaza Suite 545, 17304 Preston Rd., Dallas, Tex. 75252, Rohm & Haas having headquarters at 7th floor, Independence Mall West, Philadelphia, Pa. 19105.] Patch film 60 thereafter passes so far around adhesive metering roll 210 (rotating clockwise) that the adhesive-coated side of patch film 60 is in an orientation wherein the adhesive is on the top- surface of patch film 60, as adhesive-coated patch film 60 moves between adhesive metering roll 210 and drying oven entrance idler roll 216.

Thereafter, adhesive-coated patch film 60 is directed over drying oven entrance idler roll 216, and passed through oven 218 within which adhesive coated patch film 60 is dried to a degree that the adhesive on patch film 60 becomes tacky. Upon exiting oven 218, patch film 60 is directed partially around oven-exit idler roll 220, following which patch film 60 is cooled on chill rolls 222 and 224, each of which has a surface temperature of about 40–45° F., and a diameter of about 12 inches. The cooling of patch film 60 is carried out in order to stabilize patch film 60 from further shrinkage.

Thereafter, patch film 60 is directed, by idler rolls 226 and 228, onto a belt of pre-cutting vacuum conveyor assembly 230, and thereafter forwarded to a rotary scissors-type knife having upper rotary blade assembly 232 and lower blade 234, the knife cutting across the width of patch film 60 in order to form patches 236. Patches 236 are forwarded and held on top of a belt of post-cutting vacuum conveyor assembly 238. While patches 236 are held on the belt of post-cutting vacuum conveyor assembly 238, tubing-supply roll 240 supplies biaxially oriented, lay-flat bag film tubing 110, which is directed, by idler roll 242, to corona treatment devices 244 which subject the upper surface of lay-flat tubing film 240 to corona treatment as lay-flat tubing film 240 passes over corona treatment roll 246. After corona treatment, lay-flat tubing film 110 is directed, by idler roll 248, partially around the surface of upper prelamination nip roll 250 and through the nip between upper prelaminating nip roll 250 and lower prelaminating nip roll 252, the pre-laminating nip rolls being above and below the post-cutting vacuum conveyor belt. Prelaminating nip rolls 250 and 252 position patches 236 onto the now lower, corona-treated outside surface of lay-flat bag film tubing 110. After passing through the nip between prelaminating nip rolls 250 and 252, lay-flat bag film tubing 110, having patches 236 laminated intermittently thereon, exits off the downstream end of the post-cutting vacuum conveyor assembly 238, and is directed through the nip between upper laminating nip roll 254 and lower laminating nip roll 256, these rolls exerting pressure (about 75 psi) in order to secure patches 236 to lay-flat tubing 110, to result in tubing-patch laminate 258.

FIG. 12A is a continuation of the schematically-illustrated process of FIG. 11. In FIG. 12A, tubing-patch laminate 258 is forwarded to a pair of lower nip rolls 260, following which tubing-patch laminate 258 is inflated with air to form a bubble between lower nip rolls 260 and upper nip rolls 270. Extending patch portion 272 of adhesive-coated patch 236 (i.e., the portion of patch 236 which extends outwardly from the lay-flat side edge of tubing film 110), successively contacts rollers 262, 264, 266, and 268. Each of rollers 262, 264, 266, and 268, in sequence, forces extending patch portion 272 around and against a portion of the other lay-flat side of tubing 110, i.e., on the other side of crease 276, relative to that portion of patch 236 which was laminated to tubing 110 before inflation. Together, rollers 262, 264, 266, and 268 sequentially wrap extending patch portion 272 around tubing film 110 to achieve a smooth, wrinkle-free lamination of the extending patch portion 272 for each of patches 236. Surprisingly, it has been discovered that extending patch portion 272 naturally tends to fold around inflated film tubing 110. Upper nip rollers 270 are preceded by sets of rollers 274 which return the now fully laminated tubing-patch laminate 278 to the previous lay-flat configuration of tubing 110. (Note that downstream of nip rollers 279, tubing-patch laminate 278, unlike tubing patch laminate 258, is illustrated as having the patch adhered to both sides of lay-flat tubing 110.) Thereafter, tubing-patch laminate 278 is forwarded past guide rollers 280 and 282, following which tubing-patch laminate 278 is converted into individual patch bags 284 by sealing and cutting apparatus 286. Thereafter, patch bags 284 are boxed for shipment to a user, where a product is placed in the patch bag (preferably a bone-in meat product), after which the upper end of patch bag 284 is sealed, generally heat sealed.

FIG. 12B illustrates a view from above of the process illustrated in FIG. 12A. As can be seen in FIG. 12B, rollers 262, 264, 266, and 268 are arranged more-or-less tangentially with respect to inflated tubing 110, with lowermost roller 262 contacting patch 236 at a point at or near the lay-flat crease 276. Each of rollers 264, 266, and 268 moves the tangential contact point further around the "second" side of inflated tubing 110, i.e., the side of inflated tubing 110 to which patch 236 was not adhered prior to inflation of tubing 110. Thus, FIG. 12B illustrates the relationship between rollers 262, 264, 266, and 268 and extending portion 272 of patch 236. In reality, rollers 262, 264, 266, and 268 do not merely touch extending portion 272 tangentially with respect to inflated tubing 110. Rather, the contact between rollers 262, 264, 266, and 268 is across a path wide enough to allow the roller to exert enough force against inflated tubing 110 to cause patch 236 to become smoothly and securely adhered to tubing 110.

The result of the process illustrated in FIGS. 11, 12A, and 12B is a patch bag which can be as illustrated in FIGS. 1–3, i.e., an end-seal patch bag; alternatively, the sealing and cutting can be carried out in a manner so that the resulting patch bag is as illustrated in FIGS. 4–6. The patches can be wide enough that portions 272 extend from each of the two lay-flat side edges of tubing film 110. In such a case, although not illustrated, two sets of rollers have been utilized in that portion of the process illustrated in FIGS. 12A and 12B (only one set is illustrated in FIG. 12A and FIG. 12B). That is, two separate sets of rollers could be used, one on either side of inflated tubing 110, to wrap two extending portions 272 of patch 236 around a first side edge of tubing 110, as well as around a second side edge of tubing 10, respectively. The preferred embodiments illustrated in FIGS. 1–3 illustrate an end-seal patch bag having a patch which wraps around both the first side edge of the bag tubing, as well as around the second side edge of the bag tubing.

In a supplemental process which also is not illustrated, before converting tubing-patch laminate 258 to a patch bag, a second patch can be applied to the second lay-flat side of tubing-patch laminate 258. This would be desirable if patch 236 does not wrap around the entirety of tubing film 110. For the packaging of a pair of whole, bone-in loins in an end-seal bag, it is believed to be advantageous to apply a second patch, having a width of 4 to 5 inches, down the center of the second lay-flat side of the bag. The edges of the second patch remain several inches from the edges of the first patch In another non-illustrated alternative to the patch bags and processes described above, the patch bag in accordance with the present invention can be made by adhering a continuous patch film to a continuous lay-flat tubing film, i.e., in contrast to adhering separate pieces of patch film to the continuous flat film. The resulting laminated article can then be converted into patch bags by sealing and cutting through the entire laminated article. In this embodiment, it is preferable to have the patch material extend around the entirety of the tubular bag film, in order that the sealing be through an amount of material which is of uniform thickness. Adhering a continuous patch film to a bag tubing is disclosed in copending U.S. Ser. No. 08/579,712, to T. T. Oberle, filed Dec. 28, 1995, entitled "PATCH BAG HAVING CONTINUOUS PATCH," which is hereby incorporated, in its entirety, by reference thereto.

Sealing and cutting to convert tubing-patch laminate-to a patch bag can be carried out in any conventional process as known to those of skill in the art. Preferably, heat seals are made using a hot bar (heat seal) or a nichrome wire fixed to a chilled metal bar (impulse seal), as is known to those of skill in the art, or any other sealing means known to those of skill in the art, such as ultrasonic radiation, radio frequency radiation, and laser. The preferred sealing means is an impulse sealer. Films which are predominantly polyethylene are generally sealed using impulse sealing or hot bar sealing. Both linear and shaped seals can be formed, as is known to those of skill in the art. In general, sealing and cutting of tubing to produce bags is disclosed in U.S. Pat. No. 3,552,090, U.S. Pat. No. 3,383,746, and U.S. Ser. No. 844,883, filed Jul. 25, 1969, to OWEN, each of these two U.S. Patents, as well as the U.S. Patent Application, hereby being incorporated by reference thereto, in their entireties. As can be readily recognized by those of skill in the art, a patch bag according to the present invention can be produced as an end-seal bag or a side seal bag.

Although in general the bag according to the present invention can be used in the packaging of any product, the bag of the present invention is especially advantageous for the packaging of food products, especially fresh meat products, even more particularly, bone-in fresh meat products. Among the meat products which can be packaged in the films and packages according to the present invention are poultry, pork, beef, lamb, goat, horse, and fish. More preferably, the meat product comprises at least one member selected from the group consisting of ham, sparerib, picnic, back rib, short loin, short rib, whole turkey, and pork loin. More specifically, the meat product can comprise bone-in ham, including both smoked and processed ham, fresh bone-in ham, turkey, chicken, and beef shank.

All ranges within all of the above-disclosed ranges are expressly included within this specification. Moreover, layers which are adjacent or directly adhered to one another are preferably of differing chemical composition, especially differing polymeric composition. All reference to ASTM tests are to the most recent, currently approved and published version of the ASTM test identified, as of the priority filing date of this application.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. An end-seal patch bag comprising a seamless tubular bag having an open top, a first side edge, a second side edge, a bottom edge, an end seal, and a patch adhered to an outside surface of the bag, wherein the patch extends across more than 50 percent of a total transverse cross-sectional surface of the bag, and the patch has a length less than a length of the bag.

2. The end-seal patch bag according to claim 1, wherein the patch extends across at least 50 percent of a first lay-flat side of the bag.

3. The end-seal patch bag according to claim 2, wherein the patch also extends across at least 30 percent of a second lay-flat side of the bag.

4. The end-seal patch bag according to claim 1, wherein the bag comprises a first heat-shrinkable film and the patch comprises a second heat-shrinkable film.

5. The end-seal patch bag according to claim 4, wherein the first heat-shrinkable film is a multilayer film and the second heat-shrinkable film is a multilayer film.

6. The end-seal patch bag according to claim 5, wherein the first heat-shrinkable film comprises:

an outside abuse layer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer;

an inner $O_2$-barrier layer comprising at least one member selected from the group consisting of ethylene/vinyl alcohol copolymer, polyvinylidene chloride, polyamide, polyester, polyacrylonitrile;

an inside sealant layer comprising at least one member selected from the group consisting of thermoplastic polyolefin, thermoplastic polyamide, thermoplastic polyester, and thermoplastic polyvinyl chloride.

7. The end-seal patch bag according to claim 4, wherein the second heat-shrinkable film comprises at least one member selected from the group consisting of ethylene/alpha-olefin copolymer having a density of from about 0.85 to 0.95, propylene/ethylene copolymer, polyamide, ethylene/vinyl acetate-copolymer, ethylene/methyl acrylate copolymer, and ethylene/butyl acrylate copolymer.

8. The end-seal patch bag according to claim 7, wherein the second biaxially-oriented, heat-shrinkable film comprises at least one member selected from the group consisting of linear low density polyethylene, homogeneous ethylene/alpha-olefin copolymer, and ethylene/vinyl acetate copolymer.

9. A side-sea patch bag comprising a tubular bag having an open top, a seamless bottom edge, a first side seal, and a second side seal, the tubular bag having a patch adhered to an outside surface thereof, the patch covering at least a portion of the bottom edge of the bag, the patch extending across more than 50 percent of a total longitudinal cross sectional surface of the bag.

10. A packaged product, comprising:
   (A) a package comprising an end-seal patch bag comprising a seamless tubular bag having a first side edge, a second side edge, a bottom edge, a bottom end seal, and a top end seal, and a patch adhered to an outside surface of the bag, wherein the patch extends across more than 50 percent of a total transverse cross-sectional surface of the bag, and the patch has a length less than a length of the bag; and
   (B) a meat product in said package, the meat product comprising bone.

11. The packaged product according to claim 10, wherein the meat product comprises at least one member selected from the group consisting of poultry, pork, beef, lamb, goat, horse, and fish.

12. A packaged product, comprising:
   (A) a package comprising an side-seal patch bag comprising a tubular bag having a seamless bottom edge, a first side seal, a second side seal, and a top seal, the tubular bag having a patch adhered to an outside surface thereof, the patch covering at least a portion of the bottom edge of the bag, the patch extending across more than 50 percent of a total longitudinal cross-sectional surface of the bag, and the patch has a length less than a length of the bag; and
   (B) a meat product in said package, the meat product comprising bone.

13. The packaged product according to claim 12, wherein the meat product comprises at least one member selected from the group consisting of poultry, pork, beef, lamb, goat, horse, and fish.

14. The side-seal patch bag according to claim 9, wherein the patch extends across at least 50 percent of a first lay-flat side of the bag.

15. The side-seal patch bag according to claim 14, wherein the patch also extends across at least 30 percent of a second lay-flat side of the bag.

16. The side-seal patch bag according to claim 9, wherein the bag comprises a first heat-shrinkable film and the patch comprises a second heat-shrinkable film.

17. The side-seal patch bag according to claim 16, wherein the first heat-shrinkable film is a multilayer film and the second heat-shrinkable film is a multilayer film.

18. The side-seal patch bag according to claim 17, wherein the first heat-shrinkable film comprises:

an outside abuse layer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer;

an inner $O_2$-barrier layer comprising at least one member selected from the group consisting of ethylene/vinyl alcohol copolymer, polyvinylidene chloride, polyamide, polyester, polyacrylonitrile;

an inside sealant layer comprising at least one member selected from the group consisting of thermoplastic polyolefin, thermoplastic polyamide, thermoplastic polyester, and thermoplastic polyvinyl chloride.

19. The side-seal patch bag according to claim 16, wherein the second heat-shrinkable film comprises at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer.

20. The side-seal patch bag according to claim 19, wherein the second biaxially-oriented, heat-shrinkable film comprises at least one member selected from the group consisting of linear low density polyethylene, homogeneous ethylene/alpha-olefin copolymer, and ethylene/vinyl acetate copolymer.

21. The end-seal bag according to claim 1, wherein the patch is adhered to the bag with an adhesive.

22. The end-seal bag according to claim 1, wherein the patch is adhered to the bag with corona treatment.

* * * * *